US009188780B2

(12) United States Patent
Potakowskyj

(10) Patent No.: US 9,188,780 B2
(45) Date of Patent: Nov. 17, 2015

(54) HEAD-UP DISPLAY SYSTEM

(71) Applicant: Jabil Circuit, Inc., St Petersburg, FL (US)

(72) Inventor: Christoph Potakowskyj, Vienna (AT)

(73) Assignee: Jabil Circuit, Inc., St. Petersburg, FL (US)

( * ) Notice: Subject to any disclaimer, the term of this patent is extended or adjusted under 35 U.S.C. 154(b) by 0 days.

(21) Appl. No.: 14/222,921

(22) Filed: Mar. 24, 2014

(65) Prior Publication Data

US 2015/0043082 A1 Feb. 12, 2015

(30) Foreign Application Priority Data

Mar. 27, 2013 (EP) .................................... 13161252

(51) Int. Cl.
| G02B 27/14 | (2006.01) |
| G09G 5/00 | (2006.01) |
| G02B 27/01 | (2006.01) |
| G02B 7/00 | (2006.01) |
| G02B 7/182 | (2006.01) |

(52) U.S. Cl.
CPC ............ G02B 27/0149 (2013.01); G02B 7/005 (2013.01); G02B 27/01 (2013.01); G02B 27/0101 (2013.01); G02B 7/1821 (2013.01); G02B 2027/0123 (2013.01); G02B 2027/0154 (2013.01); G02B 2027/0156 (2013.01); G02B 2027/0167 (2013.01); G02B 2027/0169 (2013.01)

(58) Field of Classification Search
CPC .............. G02B 27/01; G02B 27/0101; G02B 27/0149; G02B 27/0018; G02B 7/002; G02B 7/005; G02B 7/1821; G02B 2027/0123; G02B 2027/0147; G02B 2027/0154; G02B 2027/0156; G02B 2027/0167; G02B 2027/0169
USPC .................. 359/629–633, 636, 599; 345/7–9; 361/725
See application file for complete search history.

(56) References Cited

U.S. PATENT DOCUMENTS

| 5,065,976 | A | | 11/1991 | Woody | |
| 5,457,575 | A | * | 10/1995 | Groves et al. | 359/631 |
| 5,677,701 | A | * | 10/1997 | Okuyama et al. | 345/7 |
| 5,905,477 | A | * | 5/1999 | Kuwayama et al. | 345/7 |
| 6,301,053 | B1 | * | 10/2001 | Cheesman | 359/632 |
| 6,504,518 | B1 | * | 1/2003 | Kuwayama et al. | 345/7 |
| 6,930,836 | B2 | * | 8/2005 | Harada et al. | 359/632 |
| 7,570,429 | B2 | * | 8/2009 | Maliah et al. | 359/630 |

(Continued)

FOREIGN PATENT DOCUMENTS

WO    WO-2007/057608    5/2007

Primary Examiner — Loha Ben
(74) Attorney, Agent, or Firm — Volpe and Koenig, P.C.

(57) ABSTRACT

The disclosure relates to a head-up display system (1) for usage in automobiles, comprising a protective housing (2) and a combiner positioning device (3) to pivotably and/or slidably guide a foldable combiner (4) between a folded-in storage position (S) and a folded-out operating position (O). In case of an accident when an external compression force (F) that impacts on the combiner (4) and/or the combiner positioning device exceeds a specified limit, at least one predetermined breaking point (10) of a breakable bearing connection of the combiner positioning device (3) with rigid bearing components (7, 11) of the head-up display system (1) breaks in a controlled manner, whereby the combiner positioning device (3) as well as the combiner (4) are folded substantially downwards (D) into the protective housing (2).

16 Claims, 2 Drawing Sheets

(56) References Cited

U.S. PATENT DOCUMENTS

| | | |
|---|---|---|
| 7,869,129 B2 | 1/2011 | Lebreton |
| 8,427,751 B2 * | 4/2013 | Rumpf et al. ............... 359/632 |
| 8,953,247 B2 * | 2/2015 | Rumpf et al. ............... 359/632 |
| 9,063,327 B2 * | 6/2015 | Moussa ............... G02B 7/1821 |
| 9,063,329 B2 * | 6/2015 | Jeon ................ G02B 27/0149 |
| 2014/0340851 A1 * | 11/2014 | Yomogita ................ 361/725 |
| 2014/0368097 A1 * | 12/2014 | Yomogita ................ 312/23 |
| 2014/0368922 A1 * | 12/2014 | Tohda et al. ............... 359/630 |
| 2015/0070771 A1 * | 3/2015 | Jeon et al. ............... 359/630 |
| 2015/0212323 A1 * | 7/2015 | Kobayashi ............ B60K 35/00 359/630 |

* cited by examiner

HEAD-UP DISPLAY SYSTEM

CROSS-REFERENCE TO RELATED PATENT APPLICATIONS

This application claims the benefit of European Application 13161252.5, filed Mar. 27, 2013, including the specification, drawings, claims and abstract, is incorporated herein by reference in its entirety.

BACKGROUND

The present disclosure concerns a head-up display system usable for traffic applications such as in automobiles according to the appended claims.

SUMMARY

A head-up display or HUD is a transparent display panel that presents information to a user without requiring users to look away from a preferred viewing direction. The origin of the name stems from a pilot being able to view information with the head positioned "up" and looking forward, instead of angled down looking at lower instruments. Although they were initially developed for military aviation, HUD systems are nowadays used in commercial aircraft, automobiles, and other applications.

For example a driver can view traffic and the road in front of the vehicle through the transparent panel of a HUD system that is attached to a dashboard close to a windshield of the vehicle. A typical HUD system comprises a combiner, a projector and a video data source such as a computer. The combiner is typically an angled flat piece of glass or plastic located directly in front of the viewer that redirects the projected image from the HUD projector in such a way as to see the field of view and the projected image at the same time. Combiners may have special coatings that reflect the monochromatic light projected onto it from the projector unit while allowing all other wavelengths of light to pass through. In some optical layouts combiners may also have a curved surface to refocus the image from the projector. A combiner is comparable to a semi-transparent mirror. The HUD projector is usually mounted above or below the combiner. The computer provides the interface between the projector and the systems or data to be displayed and generates the imagery and symbology to be displayed by the HUD projector towards the combiner which then further projects the images to the user.

Combiner positioning mechanisms for a HUD system which can be moved between a storage position and an operating position are known in the art. For example such a combiner is disclosed in document WO 2007/057608 A1. In this design the combiner is stored in a protective housing when in a storage position. In an operating position the combiner is unfolded and projects out of the vehicle's dashboard.

Combiner positioning mechanisms require careful consideration to ensure the performance in all kinds of environmental conditions such as changing humidity and a wide range of temperatures especially within a dashboard of a car. In such systems, thorough choice of materials and design is necessary to provide smooth motion. Repeatable positional accuracy is also important for combiner positioning mechanisms, because an improperly positioned combiner will not function properly in a HUD system. Another key design consideration relates to vibration. A mobile HUD system must have a high resistance to vibration in order to provide a stable image for the user. Failure to control vibration associated with the combiner in particular can result in a display that is irritating for the viewer and unpleasant to use over extended periods. Accordingly, a positioning device for a combiner in a HUD system should have a high stability and a high natural frequency.

Thus the combiner needs to be positioned very rigid in the operating position to prevent vibration and reduced image quality. Therefore a combiner holder and the connecting mechanism to the car body have to be very stiff.

In case of a car accident when pedestrians are involved a deflectable bonnet, a safety wind shield as well as compressible dashboard structures are required to enhance pedestrian protection and to avoid serious injuries of the accident victims. In general to protect a pedestrian in a car accident it is important that sufficient clearance is provided above the stiff structures beneath like a HUD system with an unfolded combiner in operating position which would stop deflection. As the combiner in its operating position is located in the dashboard close to the windshield, there is high chance of serious head injuries of a pedestrian if the combiner holder and the combiner positioning mechanisms are too rigid.

Depending on the design of the HUD system the protective housing can either be also made of a rigid material if it has to contribute as rigid bearing component to connect the combiner holder to the car body. In this case at least the surfaces on the upper side of the protective housing have to be covered with soft, flexible layers of the dashboard to absorb an impact of a person involved in a car accident and to prevent serious injuries. In another design the protective housing of the HUD system itself is made of a soft, flexible material that absorbs compression forces during an accident. If these compression forces exceed a certain limit than the protective housing will collapse and also be folded downwards into the dashboard.

The aim of the disclosure is to provide a HUD system for automobiles that overcomes the disadvantages known in the state of the art, that enhances pedestrian protection and that fulfils current safety regulations for pedestrian protection. This problem is solved by a head-up display with a combiner positioning device according to the appended claims.

According to the disclosure a head-up display system for usage in automobiles, comprising a protective housing and a combiner positioning device to pivotably and/or slidably guide a foldable combiner between a folded-in storage position and a folded-out operating position is supplied with at least one predetermined breaking point of a breakable bearing connection of the rigid bearing components of the of the head-up display system to the car body that breaks in a controlled manner in case of an accident when an external compression force that impacts on the combiner and/or the combiner positioning device exceeds a specified limit, whereby the combiner positioning device as well as the combiner are folded substantially downwards into the protective housing and into the dashboard, respectively.

Particularly advantageous a high external compression force that impacts on the folded-out combiner during a car accident when a pedestrian is bumped against the dashboard after breakage of the safety windshield will lead to a collapse of the at least one predetermined breaking point of a breakable connection between the combiner positioning device and the rigid bearing components of the of the head-up display system. Thus the combiner positioning device as well as the combiner itself and—according to design—respective combiner chassis parts will fold down and dive substantially downwards into the internal space of the protective housing of the HUD system. Depending on the design of the protective housing it might also collapse itself and dive together with the combiner, combiner chassis parts and combiner position device parts down into the dashboard. Serious injuries due to a folded-out combiner shield can be advantageously be avoided.

Another appropriate version of the disclosure concerns a head-up display system wherein the combiner positioning device comprises two positioning plates on its outsides that are each connected with the rigid bearing components to the car body via at least one breakable bearing connection having a predetermined breaking point. In this design the positioning plates of the combiner positioning device are for example arranged symmetrically adjacent to the combiner as well as combiner chassis parts that are arranged between the positioning plates.

A further alternative of the disclosure comprises a head-up display system in that the combiner positioning device is connected with the rigid bearing components to the car body by at least one actuator means, whereas the predetermined breaking point is arranged on the at least one actuator means.

In a further development of the disclosure the actuator means is shaped like a lever arm that is connected with the combiner positioning device on its one free end and features an actuator bearing on its opposite free end. Thus the magnitude of external force that has to be exceeded to break the predetermined breaking point can be adjusted according to the length of the lever arm of the actuator means and the respective leverage that is required to break the predetermined breaking point.

Particularly advantageous is a head-up display system according to the disclosure whereas each positioning plate of the combiner positioning device is connected with the rigid bearing components to the car body by at least one actuator means whereas predetermined breaking points are arranged on each of the actuator means.

In another preferred design of the disclosure the predetermined breaking point is arranged on each connection joint of the actuator means with the positioning device.

In a further alternative design of the inventive head-up display system each predetermined breaking point of a breakable bearing connection of the combiner positioning device with rigid bearing components comprises a positive-fitted and/or force-fitted and/or a friction-locked connection. Depending on the design and materials used to realize a predetermined breaking point within the disclosure all thinkable connection mechanisms can be applied to connect a breakable bearing connection of the combiner positioning device with the rigid bearing components to the car body. For example either positive-fitted connections like safety pins or other form-fit features like spring-loaded bolts that fit into notches can be used. Also force-fitted connections like a hook and loop fastener or friction-locked connections using static friction can be used to ensure that each predetermined breaking point breaks in a controlled manner in case of an accident when compression forces are above a certain limit.

In a further inventive development of a head-up display system each breakable bearing connection of the combiner positioning device with the rigid bearing components comprises at least one shear pin that is arranged on the combiner positioning device, and further comprises at least one complementary shear pin recess that is arranged on the protective housing or on an actuator means.

In an alternative design of the disclosure at least one shear pin is arranged on each of the positioning plates of the combiner positioning device.

In a further realization of an inventive head-up display system each breakable bearing connection of the combiner positioning device with the rigid bearing components comprises at least one shear pin that is arranged on the protective housing or on an actuator means, and further comprises at least one complementary shear pin recess that is arranged on the combiner positioning device.

Usefully in another completion of an inventive head-up display system at least one shear pin recess is arranged on each of the positioning plates of the combiner positioning device.

Advantageously at a head-up display system according to the disclosure each shear pin precisely matches into a shear pin recess forming a positive-fit connection. Thus with a tight fit connection a high resistance to vibration in order to provide a stable image for the user can be ensured. With this connection the positioning device for the combiner in the HUD system safeguards on the one hand a high stability and a high natural frequency and on the other hand it is ensured that in case of a car accident the shear pins collapse and the predetermined breaking points break as scheduled.

Another useful realization of a head-up display system according to the disclosure comprises shear pins arranged on the protective housing and/or on the actuator means and/or on the combiner positioning device that are manufactured via moulding, preferably via outsert moulding.

Advantageously at a head-up display system according to the disclosure the at least one predetermined breaking point breaks when a compression force above a limit value of 600 N, preferred above a limit value of 400 N, particularly preferred above a limit value of 200 N, impacts in a substantially angular direction on the combiner in its operating position. The compression force that impacts during a car accident on the combiner shield in its operating position usually hits the combiner in a substantially angular direction compared to the horizontal direction, by way of example at an angle of approximately 45° compared to the horizontal direction. If the external compression forces are above the specified limits, than the combiner has to collapse and fold down. The range of limiting values of the external compression force that might impact on the combiner in case of an accident depends on current legal regulations of pedestrian protection measures that have to be fulfilled by car manufacturers. The limiting values of external compression forces are assessed in standardized testing by crash-test-dummies.

Further details and advantages of the combiner positioning device in a head-up display according to the disclosure will become more apparent in the following description and the accompanying drawings.

DETAILED DESCRIPTION OF THE PREFERRED EMBODIMENTS

Figure 1:
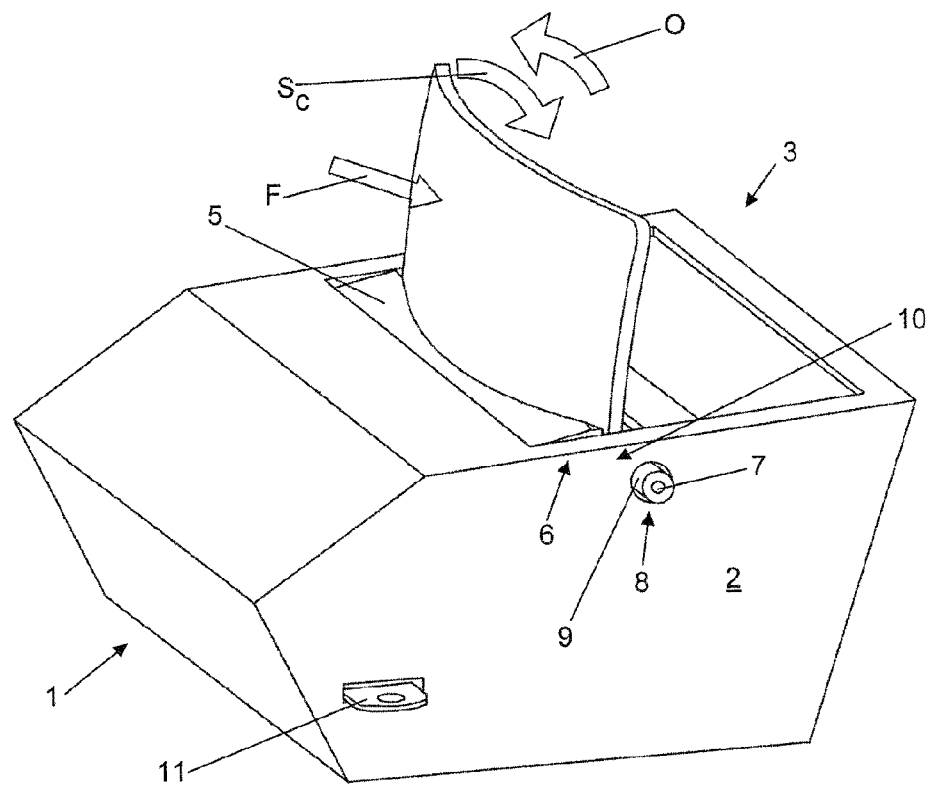
FIG. 1 is a perspective view of a protective housing of a head-up display (HUD) according to the disclosure with an expanded combiner in its operating position.

FIG. 1 shows a head-up-display (HUD) system 1 with a protective housing 2 to be integrated within a dashboard of an automobile. The HUD system 1 further comprises a combiner positioning device 3 to pivot and/or slide the combiner 4 between a storage position Sc, symbolized by a cursor Sc, and an operating position O, symbolized by a cursor O. In storage position Sc the combiner 4 is folded down or folded in, respectively, into a recess or internal space of the protective housing 2. During operation of the vehicle the combiner is folded out of the protective housing 2 and set in its operating position O as is depicted in FIG. 1. The combiner 4 is a transparent panel that includes optical coatings that reflect those specific wavelengths that are projected by a HUD projector which is not explicitly shown in FIG. 1. Also a video data source like a computer that is usually required to project information via the projector on the combiner 4 and thus enable proper function of the HUD system 1 is not shown in the Figures.

The combiner positioning device 3 of the HUD system 1 as well as a combiner chassis 5 that holds the combiner 4 need to be rigid to avoid vibration and to ensure optimum picture quality. The combiner chassis 5 has proper guiding means on each of its outsides that interact with the complementary guiding means that are situated on the combiner positioning device 3. Also external forces like a compression force F, symbolized via a cursor F, have to be absorbed by the rigid combiner chassis 5 and the combiner positioning device 3, respectively, within the protective housing 2 as long as these forces, symbolized by the compression force F, are below specified limits. Actuator means 6 that support the combiner positioning device 3 on its both outsides within the protective housing 2 are each connected to actuator bearings 7 that act in the case of an emergency as pivot points 8 for the combiner positioning device 3 as well as the combiner chassis 5. Corresponding recesses 9 in the protective housing 2 of the HUD system 1 serve as bearings for the actuator bearings 7.

When external forces like an external compression force F exceed a specified limit due to a car accident with a pedestrian being crashed against the wind shield and the dashboard, the combiner positioning device 3 will break in a controlled manner at predetermined breaking points 10. Thus the guiding fixture of the combiner chassis 5 will break and the combiner 4 of the HUD system 1 will fold down immediately.

Figure 2:
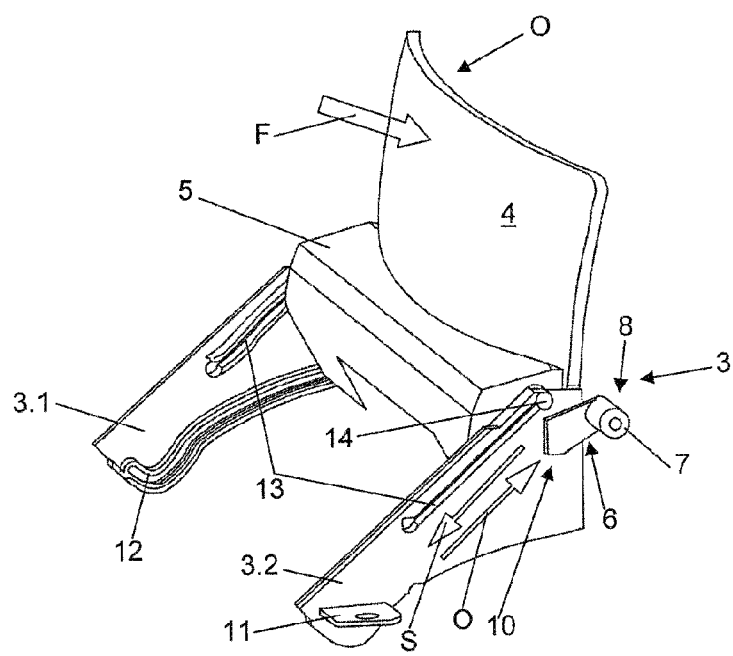
FIG. 2 is a perspective view of a combiner positioning device and the combiner without the surrounding protective housing with the expanded combiner in its operating position.

FIG. 2 is a perspective view of a combiner positioning device 3 without the surrounding protective housing 2 showing the expanded combiner 4 in its operating position O. Fixture bearings 11 like fixture lugs serve together with the actuator bearings 7 as rigid bearing components to attach the combiner positioning device 3 and the HUD system 1, respectively, to stiff structures of a vehicle body beneath the dashboard. The actuator means 6 that are connected to the combiner positioning device 3 on its both outside positioning plates 3.1 and 3.2 are formed here in the shape of lever arms with actuator bearings 7 acting as pivot points 8 on each free end of the lever arm. The predetermined breaking points 10 to allow a controlled breakage of the combiner 4 are arranged here at the connection of each actuator means 6 with the combiner positioning device 3. Further on the combiner positioning device 3 comprises respective guideways 12 and guiding slots 13 to take up guiding joints 14 that are positioned on each outside of the combiner chassis 5. The guideways 12 and guiding slots 13 are arranged on the positioning plates 3.1 and 3.2 of the combiner positioning device 3. Thus the combiner positioning device 3 supports the pivotable and slidable bearing of the combiner chassis 5 and the combiner 4, respectively, within the protective housing 2 of the HUD system 1. In FIG. 2, cursor direction S indicates the sliding movement of guiding joint 14 within the guiding slot 13 towards the storage position Sc of the combiner 4. An opposite cursor direction O indicates the sliding movement of guiding joint 14 within the guiding slot 13 towards the operating position O of the combiner 4.

Figure 3:
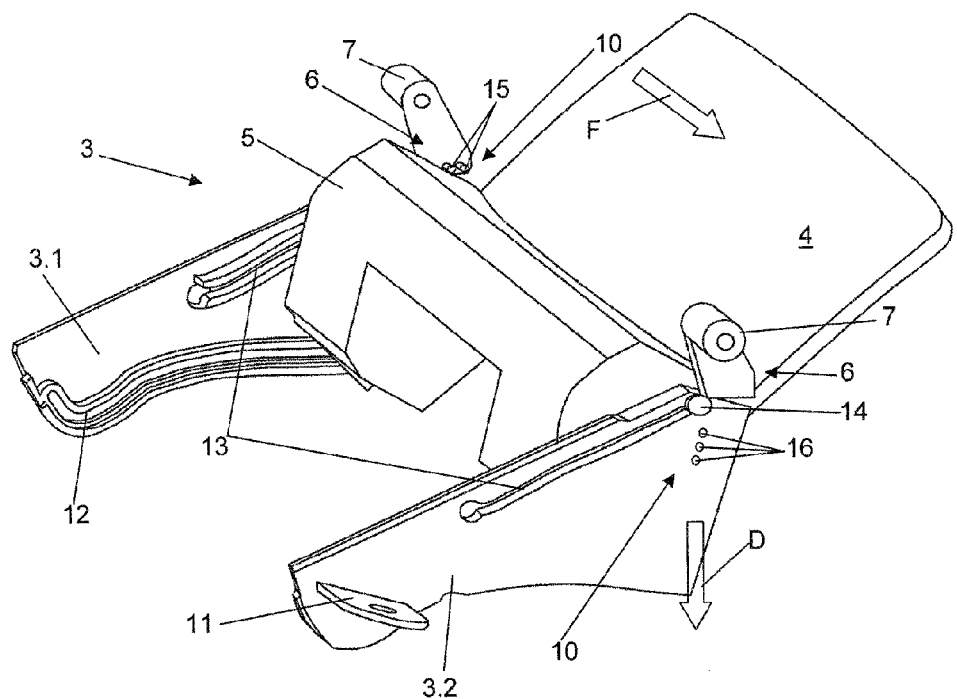
FIG. 3 is a perspective view of the combiner positioning device according to FIG. 2 with actuator means of the combiner positioning device being broken in a controlled manner during a car accident with a pedestrian.

FIG. 3 is a perspective view of the combiner positioning device 3 according to FIG. 2 with actuator means 6 being broken in a controlled manner along predetermined breaking points 10 during a car accident with a pedestrian. As the compression force F that impacts on the shield of the combiner 4 in a substantially angular direction exceeds a specified limit, the combiner chassis 5 that is pivotably or slidably, respectively, guided and mounted by the combiner positioning device 3 transmits the compression force F via the actuator means 6 to the actuator bearing 7 that supports the combiner positioning device 3. Thus the combiner positioning device 3 breaks at the predetermined breaking points 10 that are arranged here on each joint connection between the combiner positioning device 3 and the actuator means 6. Thus the combiner positioning device 3 as guiding fixture of the combiner chassis 5 breaks and the combiner 4 together with its combiner chassis 5 folds down in cursor direction D in the recess of the protective housing 1 immediately. Serious head injuries caused by a rigid combiner 4 being folded out in its standard operating position O can reliably be avoided with this inventive combiner positioning device 3.

The predetermined breaking points 10 that are here located at the joint connection between the combiner positioning device 3 and the actuator means 6 can be described in more detail with reference to FIGS. 4 and 5.

Figures 4, 5:
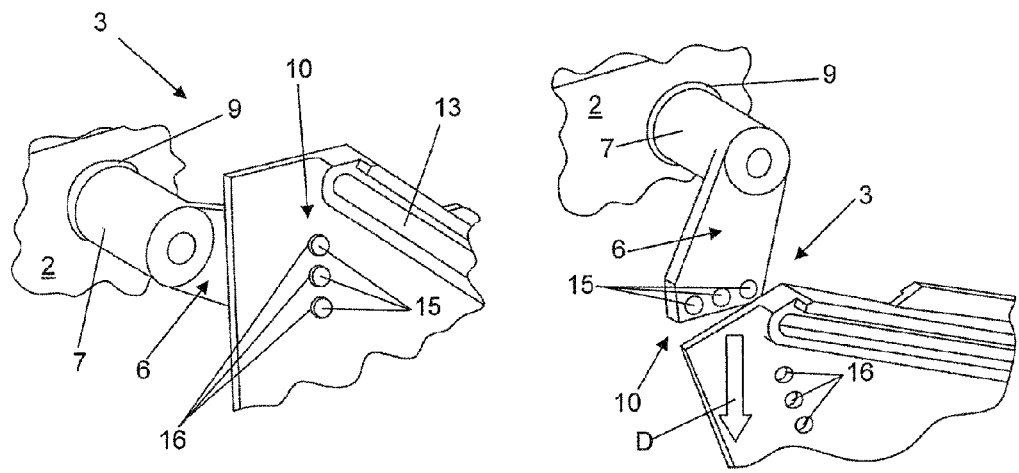
FIG. 4 refers to FIG. 2 showing in a perspective view in detail actuator means of the combiner positioning device in standard operating position.
FIG. 5 refers to FIG. 4 showing actuator means of the combiner positioning device being broken in a controlled manner during a car accident with a pedestrian.

FIG. 4 refers to FIG. 2 showing in a perspective view in detail actuator means 6 that act as support bearings of the combiner positioning device 3 and allow sliding or swivelling the combiner 4 between its operating position O and its storage position. A free end of each actuator means 6 opposite to the end where the actuator bearing 7 is situated shows several shear pins 15 that precisely fit into complementary shear pin recesses 16 that are positioned on the outside positioning plates 3.1 and 3.2 of the combiner positioning device 3. These shear pins 15 are here made of hard plastic and the actuator means 6 with the shear pins 15 are manufactured by outsert moulding. Within the scope of the disclosure it is also thinkable that the shear pins 15 and/or actuator means 6 are made of other materials like thermoplastics, thermosetting plastic or metals. The actuator bearing 7 is mounted in the recess 9 of the protective housing 2.

FIG. 5 refers to FIG. 4 showing an actuator means 6 with broken shear pins 15 as predetermined breaking points 10 during a car accident with a pedestrian. Compared with FIG. 4, it can be seen that due to the controlled breakage of the shear pins 15 acting as predetermined breaking points 10 the combiner positioning device 3 has been moved in cursor direction D substantially downwards and thus dives into the protective housing 2 and into the dashboard, respectively, to avoid fatal injuries. Thus the compression force F that impacts during a car accident on the combiner 4 in a more or less angular direction, for example in a direction of approximately 45° compared to the horizontal direction, is diverted into a substantially downward movement D of the combiner positioning device 3 as well as the combiner chassis 5 and the combiner 4 itself. The actuator means 6 stays with its actuator bearing 7 within the recess 9 of the protective housing 2. The recess 9 acts as a pivot point 8 for the actuator means 6.

It has to be stated that one skilled in the art based on above explanation of the disclosure would be able to come up with other mechanical solutions to provide a breakable bearing connection of the combiner positioning device with rigid bearing components connected to the car body.

For example instead of shear pins also spring-loaded form-fit features like notches with spheres wherein each sphere is pressed into a certain notch via a spring force could be used as predetermined breaking points. In this design that is not explicitly shown in the figures a sphere is snapped into a corresponding notch on the respective opposite part of the HUD system. If an external compression force or shear force is above a given limit this snap-fit connection collapses and the two springily mounted parts affiliated with each other will shift sideways. Thus the connection is released. In another design alternatives comprised within the disclosure but also not explicitly shown in the figures might include force-fitted connections like a hook and loop fastener or friction-locked connections using static friction to connect the combiner positioning device with the rigid bearing components and to ensure that each predetermined breaking point breaks in a controlled manner in case of an accident when compression forces are above a certain limit. Also friction-locked connections using static friction could be used together with spring-loaded friction features as connecting requisite to fulfil the requirements of a breakable bearing connection according to the inventive head-up-system.

LIST OF REFERENCE SIGNS 1 head-up-display system (HUD)
2 protective housing
3 combiner positioning device
3.1 positioning plate
3.2 positioning plate
4 combiner
5 combiner chassis
6 actuator means
7 actuator bearing
8 pivot point
9 recess in protective housing
10 predetermined breaking point
11 fixture bearing
12 guideway
13 guiding slot
14 guiding joint
15 shear pin
16 shear pin recess
D downward movement of combiner (arrow)
F compression force applied on combiner (arrow)
O operating position of combiner (arrow)
Sc storage position of combiner (arrow)
S sliding movement of guiding pin (arrow)

What is claimed is:

1. A heads-up display system (HUD) comprising:
a protective housing; and
a combiner positioning device configured to pivot and slide on a bearing to guide a foldable combiner between a folded-in storage position and a folded-out operating position, wherein the combiner positioning device comprises a breakable bearing connection comprising rigid bearing components and a predetermined breaking point, wherein the bearing connection is constructed to break in a controlled manner in response to an external compression force on one of the combiner or the combiner positioning device exceeding a specified limit, and wherein, in response to the bearing connection breaking, the combiner positioning device and the combiner are configured to fold substantially downwards into the protective housing.

2. The heads-up display system according to claim 1, wherein the combiner positioning device comprises two positioning plates, each connected with the rigid bearing components via at least one breakable bearing connection having a predetermined breaking point.

3. The heads-up display system according to claim 1, wherein the combiner positioning device is connected to the rigid bearing components by at least one actuator, wherein the predetermined breaking point is positioned on the at least one actuator.

4. The heads-up display system according to claim 3, wherein a first free end of the actuator is connected to the combiner positioning device, and wherein a second free end of the actuator is connected to an actuator bearing.

5. The heads-up display system according to claim 3, wherein the combiner positioning device comprises a plurality of positioning plates, wherein each respective positioning plate of the combiner positioning device is connected with the rigid bearing components by at least one respective actuator, and wherein each of the respective actuators comprises a predetermined breaking point.

6. The heads-up display system according to claim 3, wherein a respective predetermined breaking point is positioned on each connection joint of the at least one actuator with the combiner positioning device.

7. The heads-up display system according to claim 1, wherein the predetermined breaking point of the breakable bearing connection between the combiner positioning device and the rigid bearing components comprises at least one of a positive-fitted connection, a force-fitted connection, and a friction-locked connection.

8. The heads-up display system according to claim 1, wherein the breakable bearing connection between the combiner positioning device and the rigid bearing components comprises:
a shear pin that is arranged on the combiner positioning device; and
a complementary shear pin recess that is arranged on one of the protective housing or an actuator connecting the combiner positioning device and the rigid bearing components.

9. The heads-up display system according to claim 8, wherein the shear pin is arranged on a positioning plate of the combiner positioning device.

10. The heads-up display system according to claim 8, wherein the shear pin precisely matches into the shear pin recess forming a positive-fit connection.

11. The heads-up display system according to claim 8, wherein the shear pin is manufactured via outsert moulding.

12. The heads-up display system according to claim 1, wherein the breakable bearing connection between the combiner positioning device and the rigid bearing components comprises:
a shear pin positioned on one of the protective housing or an actuator connecting the combiner positioning device and the rigid bearing components; and
a complementary shear pin recess positioned on the combiner positioning device.

13. The heads-up display system according to claim 12, wherein the shear pin recess is positioned on a positioning plate of the combiner positioning device.

14. The heads-up display system according to claim 12, wherein the shear pin precisely matches into the shear pin recess forming a positive-fit connection.

15. The heads-up display system according to claim 1, wherein the predetermined breaking point is designed to break when a compression force above a limit value of 600 N impacts in a substantially angular direction on the combiner (4) in its folded out operating position (O).

16. The heads-up display system according to claim 1, wherein the specified limit of compression force is 200 N.

* * * * *